Dec. 4, 1951 L. A. BRYANT 2,577,509
UNIVERSAL PANEL MASTERING FIXTURE
Filed Nov. 21, 1947 3 Sheets-Sheet 1

INVENTOR
LELAND A. BRYANT
BY
*Moore & Graham*
ATTORNEYS

Dec. 4, 1951   L. A. BRYANT   2,577,509
UNIVERSAL PANEL MASTERING FIXTURE
Filed Nov. 21, 1947   3 Sheets-Sheet 2

INVENTOR
LELAND A. BRYANT
BY
*Mason & Graham*
ATTORNEYS

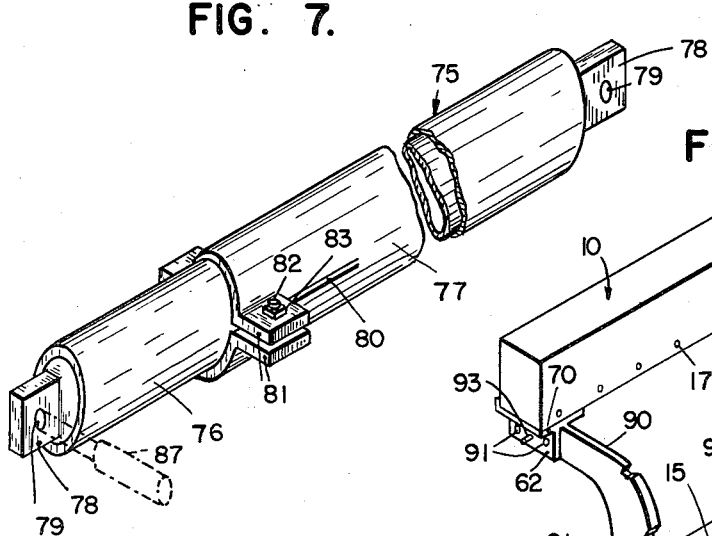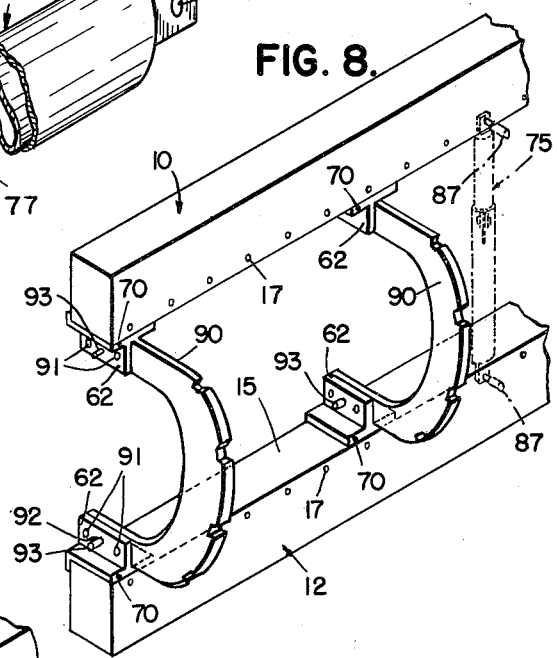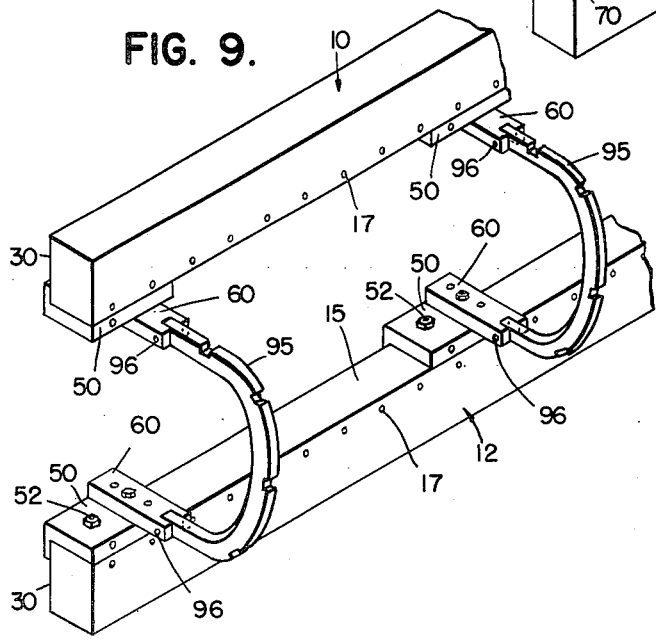

Patented Dec. 4, 1951

2,577,509

UNITED STATES PATENT OFFICE 2,577,509

UNIVERSAL PANEL MASTERING FIXTURE

Leland A. Bryant, Beverly Hills, Calif.

Application November 21, 1947, Serial No. 787,297

2 Claims. (Cl. 29—286)

This invention relates generally to the assembly of complex structures, such as airplane and bus bodies, and more particularly to the provision of a universal master fixture designed to afford means for readily assembling the various components of such structures precisely in accordance with engineering design and preplanned manufacturing methods during initial stages of production or in the building of a prototype model of a new structure. This application is a continuation in part of my copending application Serial No. 484,640, filed April 23, 1943, since matured into Patent No. 2,433,889, dated January 6, 1948.

In the manufacture of any complex structural assembly, especially one embodying panel assemblies, it is highly desirable that the same be accomplished through production breakdown which permits of mechanized prefabrication of the components which are precisely coordinated in order that they may be readily joined together in pre-planned sequences leading up to final assembly. In order to accomplish this, it has heretofore been necessary to provide extensive coordinated tooling. However, this is objectionable in that the provision of such tooling is a long and costly process involving the fabrication of master gauges and an exceptionally large number of diversified assembly jigs and fixtures.

As a result, it is often the practice to forego such manufacturing breakdown during the initial stages of production and to construct an entirely different kind of assembly fixtures which permit of fitting and joining of the loose parts into relatively large aggregations. Thus the manufacturing program is begun by building or hand methods rather than true manufacturing methods, with the result that the solution of inherent manufacturing difficulties during the early stages of production development is entirely precluded, production line up and assembly routines become crystallized on what may be termed a primitive basis and the subsequent provision and use of assembly jigs and fixtures such as are necessary for the intended manufacturing breakdown involves a revolutionary transformation in the mode of production under difficult circumstances without benefit of practical trial.

It is an object of this invention to provide means for readily assembling the numerous components of such a product or structure exactly in accordance with engineering design and planned production methods during the initial stages of production, thereby eliminating the necessity of providing otherwise costly gauges and special assembly jigs in the initial stages and making possible the practical proofing of the design and planning before any repetitive production is commenced.

It is a further object of the invention to provide a universal fixture means which may be utilized to prove out experimentally various design modifications in a given product from time to time as may be found necessary or desirable.

In my copending application hereinabove referred to, means including correlated straight edges are provided for the purpose of building assembly jigs and fixtures for use in a production assembly line operating in accordance with advanced manufacturing methods. An object of the present invention is to provide what is primarily an adjustable fixture means for use during early stages of manufacture adapted to take the place temporarily of the final fixtures produced by use of the means set forth in my copending application or by other well known methods. While the means disclosed in my copending application might be adapted for use as a fixture, it is not suitable for this purpose and necessarily is limited in its adaptability by reason of the fact that it embraces many parts unnecessary for such use. In addition, the arrangement of the parts in that device is such that the same are rendered awkward for use of the whole as a fixture. On the other hand, the present invention is primarily designed and adapted for use as a universal fixture and is peculiarly suited for this. However, the present invention may also be used in conjunction with gauges and templates to locate accurately the various parts of jigs and fixtures and thus can be used in the fabrication of fixtures for use in various stages of production.

It is also an object of the invention to provide such a fixture means as the type indicated which includes a pair of relatively adjustable parallel straight edges designed to make use of inexpensive metal templates which can be produced directly from engineering layouts and linear measurement requirements with which to accurately locate requisite nesting, clamping and work holding devices upon the straight edges. In this connection it is an object to provide means which may be readily and quickly set up or adjusted for a particular problem.

These and other objects will be apparent from the following description and acompanying drawings. Referring to the drawings, which are for illustrative purposes only:

Fig. 7 is a perspective view on a relatively large scale of a gauge suitable for use in setting the straight edges;

Fig. 8 is a perspective view of a portion of the apparatus set up for a given problem; and Fig. 9 is a perspective view of a portion of the apparatus set up for another problem.

Figure 1:
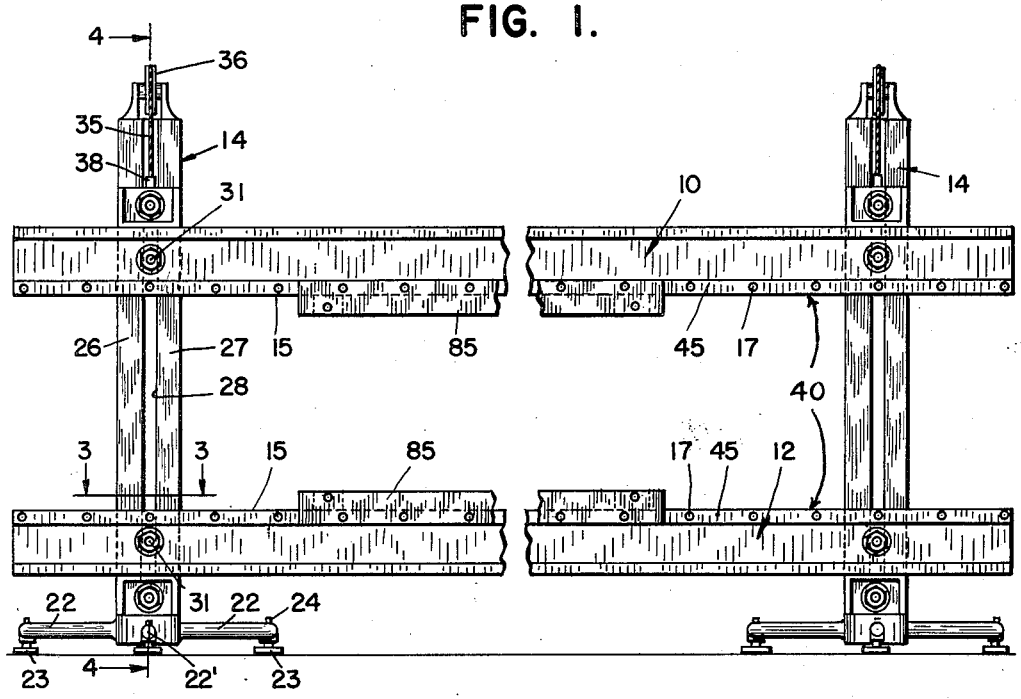
Fig. 1 is an elevational view of a device embodying the invention.
Figure 2:
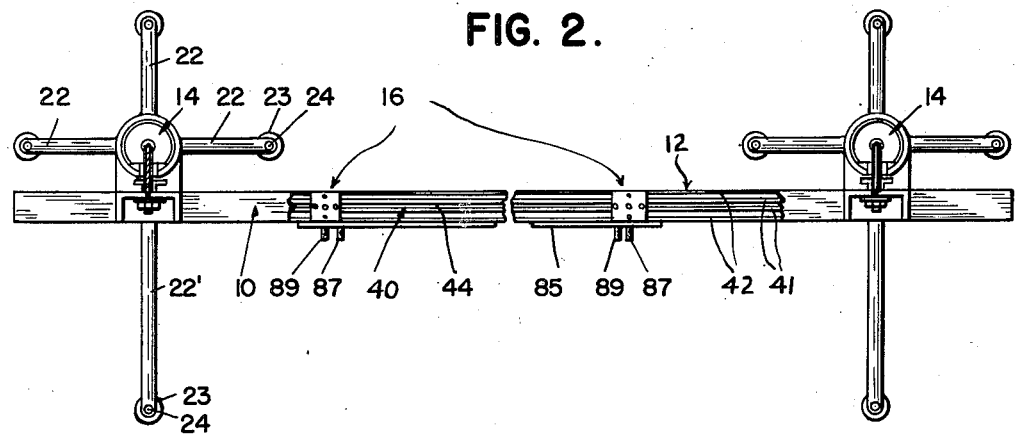
Fig. 2 is a plan view of the device shown in Fig. 1.
Figure 3:
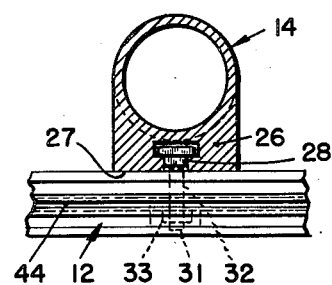
Fig. 3 is a fragmentary enlarged sectional view on line 3—3 of Fig. 1.
Figure 4:
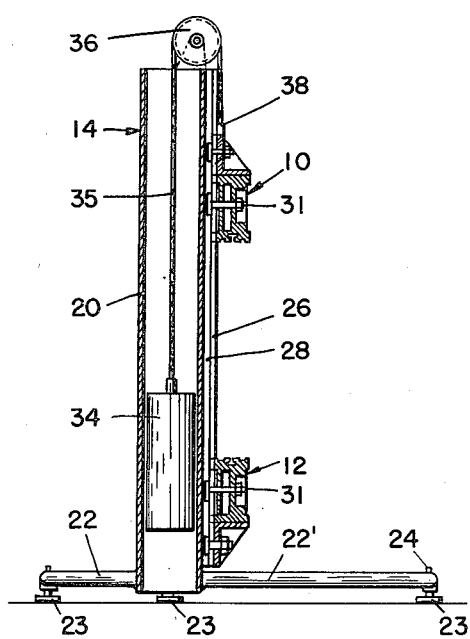
Fig. 4 is a sectional elevation on line 4—4 of Fig. 1.

More particularly describing the invention, the device of the invention comprises a pair of elongated length defining members which will be termed straight edges, generally indicated by numerals 10 and 12, which are adjustably mounted on two or more columns or posts 14. Each of the straight edges is provided with an extremely accurately machined straight working face 15 upon which may be located various fittings, one of which is shown in Fig. 2 and generally indicated by numeral 16, and with a plurality of evenly spaced reference holes 17 which will be more fully described later.

Referring particularly to the construction of the columns or posts 14 which support the straight edges, it is contemplated that any suitable upright might be used for mounting the straight edges with means for adjustably positioning the straight edges thereon. However, the form of means illustrated comprises the columns 14, each of which includes a vertically extending tube 20 which may be of steel or other suitable material mounted on a plurality of radially extending legs 22, 22' forming a base. In view of the fact that the straight edges are mounted at one side of the columns, it is preferable, in order to provide a stable structure, to utilize a somewhat longer leg (22') on the side of the column on which the straight edges are mounted. In use, each column should be vertical and for this reason each of the legs is provided with a base or floor contacting foot member 23 and at least two of these are vertically adjustable as by means of a threaded bolt 24 which may be received in the foot and threadedly mounted in the leg.

Mounted on what will be termed the front face of each tube is a vertically extending guide member or gib 26 which is welded or otherwise secured to the tube 20 in any suitable manner. The member 26 is provided with a machined flat straight face 27 against which the straight edges are secured and with a T slot 28.

The two straight edges are shown as box sections provided with a pair of machined surfaces 30—30' adjacent the columns which abut the machined surface 27 of the gib 26. The straight edges are secured to the columns by means of T bolts 31 which extend through openings 32 in the straight edges and have their heads received in the T slots 28 of the guide members. Nuts 33 are positioned on the T bolts for tightening same. With this construction the straight edges may be adjustably positioned on the columns at any desired height. It may be pointed out that the machined surface 30 extends the length of the straight edges in each case to form a squaring guide for the fittings which are located thereon, as will subsequently be described.

Preferably the upper straight edge is counterbalanced for ease of adjustment by a weight 34 within each column. A cable 35 extends from the weight over a sheave 36 at the top of the column and is anchored to the upper side of the straight edge at 38. It is contemplated that, if desired, means may be provided for counterbalancing the lower straight edge in order to afford easy vertical adjustment of this member. However, since in use the lower straight edge will usually be near the floor, this straight edge may be vertically adjusted by means of jacks placed thereunder.

The straight edges are provided with opposed working faces 40 which, in the form of the invention illustrated, comprise an inner pair of lands 41 and an outer pair 42. These faces are carefully machined to provide smooth flat accurate straight surfaces designed to accommodate suitable fittings hereinafter to be described. Intermediate the two inner faces 41 the straight edge is provided with a T slot 44.

The front faces 45 of the straight edges are provided with evenly spaced reference holes 17 disposed in the same plane. For use in making aircraft structures for example, the holes may be disposed on ten inch centers to correspond to modern aerodynamic design or "lofting" practice which makes use of reference or grid lines spaced ten inches apart. It is, of course, contemplated that the reference holes may be regularly spaced at some other distance suitable to the type of drawings and engineering data used in a particular type of production.

The straight edges are adapted to support fittings 16 to be accurately positioned thereon. The fittings may take several shapes depending upon the production problem to be solved, however, regardless of the shape of the fittings they have certain common features. These features include a reference hole for locating the fitting in a precise position on the straight edge, as will later be explained, an accurate flat face to rest on the straight edge, an accurate guide to locate the fitting in square relation to the straight edge, means whereby the fitting may be secured to the straight edge, and means whereby a template or other member may be mounted thereon.

Figure 5:
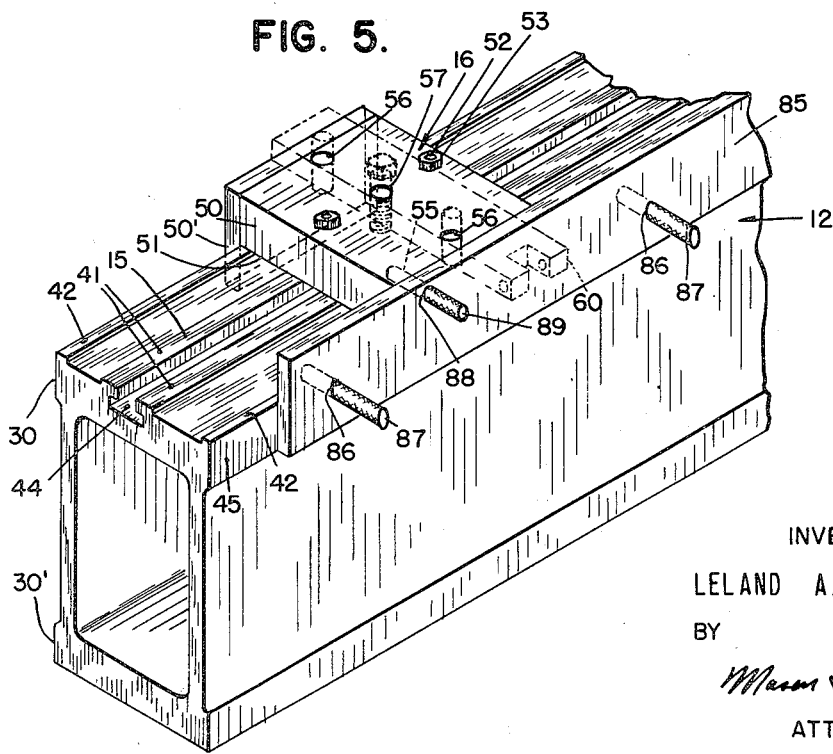
Fig. 5 is an enlarged perspective view of a portion of the lower straight edge showing a fitting mounted thereon.

Referring now to Fig. 5, which illustrates one form of fitting 16, numeral 50 indicates a platelike body provided with a flat machined undersurface 51. The member 50 is bored to accommodate a pair of T bolts 52 and nuts 53 which serve to secure the fitting to the straight edge. On one side the fitting has a depending guide flange 50' to bear against the machined surface 30. On its other side the body is provided with a locator or reference hole 55. Centrally of the fitting and in a common plane extending transversely thereof are three vertical bores, the outer two of which are smooth and indicated by numeral 56 and the inner one of which is threaded and indicated by 57. The fitting is designed to accommodate a dummy or adaptor fitting which has holes adapted to register with the holes 56 and 57 of the body 50. Such a dummy fitting is shown in broken lines in Fig. 5 and has been designated by reference numeral 60.

Figure 6:
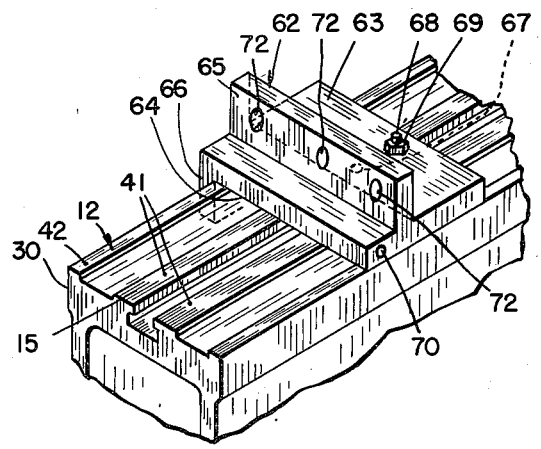
Fig. 6 is a view similar to Fig. 5 but showing another form of fitting.

In Fig. 6 there is shown a combination fitting 62 which includes a platelike body 63 having a flat undersurface 64 and an upstanding wall or flange 65 extending transversely thereof. A guide flange 66 is provided at one side of the fitting.

The body is provided with a pair of holes 67 to receive T bolts 68 which are used in conjunction with nuts 69 to secure the fitting to the straight edge. The body is also provided with a reference hole 70. Extending through the flange 65 are three holes 72 which may receive bolts for securing a template, fixture or other member to the fitting.

In use in a given problem, the straight edges are aligned so that they are parallel in the same vertical plane and spaced apart the required distance. The spacing of the straight edges may be accomplished by accurate gauges. One form of gauge which is suitable for this work is shown in Fig. 7. The gauge, indicated generally by numeral 75, comprises a pair of telescoping tubes 76 and 77 in which are mounted respectively a pair of end plates 78, bored to provide holes 79 of the same diameter as the reference holes 17 of the straight edges and the reference holes of the fittings. The outer tube is slotted at its inner end at 80 and provided with apertured lugs 81 through which bolts 82 extend, provided with securing nuts 83. The length of the gauge 75 can be determined by suitable precision means and the bolts and nuts 82, 83 tightened. Dowels 87 can be used for insertion in the holes 79 of the gauge and the reference holes of the straight edges. Preferably several of such gauges are used including one or more inclined at an angle other than 90° to the straight edges. These gauges may be left in the straight edges during the period of setting up the particular work to insure accuracy, one gauge 75 being shown in Fig. 8.

Fittings of whatever type are to be used for the particular problem can be accurately located along the straight edges by means of strip templates 85 or by use of an adjustable micro-bar gauge. These templates are elongated narrow strips of metal (Fig. 5) which have a plurality of mounting holes 86 evenly spaced along the bottom edge to correspond to the reference holes 17 of the straight edges. Along its upper edge the template is provided with one or more locating holes 88, the positions of which have been determined from an engineering layout or other data. The template is mounted on the straight edge by means of dowels 87 extending through the holes 86 and the reference holes 17 of the straight edge. Then, by means of another dowel, 89, the fitting 16 can be accurately located on the straight edge, the dowel being used to obtain registration of the hole 55 of the fitting with the locating hole 88 of the template. The fitting is then securely bolted to the straight edge and the template can either be removed or left in place to insure accuracy. Other fittings as may be required are then positioned on the straight edges in the same manner.

In Fig. 8 a plurality of formers 90, which have been cut from a master template, are shown mounted directly on the fittings 62 by means of bolts 91. It will be understood that each former has a reference hole 92 at each end and these holes are all on a common reference line running longitudinally of the structure to be fabricated. A dowel 93 may be placed through each of these holes and the corresponding holes of the fittings to check accuracy of the formers and to properly position them before they are bolted in place.

In Fig. 9, the device is shown set up to act as a fixture for holding ribs 95 which are to farm a part of a panel structure to be assembled. In this use, the adapter or dummy fittings 60 (Fig. 5) mounted on fittings 16, are used to mount the ribs by means of pins 96. In all set ups, distances of the fittings above the straight edges and the distances they extend outwardly therefrom, and the distances from the reference holes of the fittings are known and due allowance made therefor in initially positioning the straight edges and in positioning the fittings.

It will be understood that the fixture means disclosed can be utilized in many ways which have not been described and that various changes and modifications can be made therein without departing from the scope of the invention as set forth in the claims.

I claim:

1. In a universal fixture, a pair of columns mounted for movement bodily, each of said columns having a vertically extending straight guide face and means for leveling the column whereby the same may be accurately vertically disposed, a pair of elongated length defining members adapted to be mounted on said columns, said length defining members each having a longitudinally extending working face and a longitudinally extending flat guide surface at right angles thereto, said latter guide surfaces having abutting engagement with the guide faces of said columns, said members being disposed with the working faces opposed, means for adjustably securing said members to said columns in parallel spaced relation including connterbalance means operatively connected to at least one of said length defining members whereby the vertical spaced relationship of said members can be readily varied as desired, longitudinally extending vertical surfaces on each of said length defining members at right angles to said working faces having reference holes evenly spaced therealong, a locator fitting having a locator hole, said locator fitting being mounted on the working face of one of said length defining members, said locator fitting having an accurate flat face resting on said working face and an accurate flat guide surface in abutting engagement with the longitudinally flat guide surface of said length defining member for squaring the fitting relative to the length defining member, means cooperating with said locator hole in the fitting and said reference holes in the length defining member for properly positioning the fitting, and means for securing said fitting to said length defining member.

2. In a universal fixture, a pair of upright columns, each of said columns having a vertically extending flat accurate guide face, a pair of elongated length defining members each having a longitudinally extending working face and a longitudinally extending flat guide surface at right angles thereto, said latter guide surfaces having abutting engagement with the guide faces of said columns, means for adjustably securing said members to said columns in parallel relation with said working faces opposed, said working faces each comprising an inner pair of longitudinally extending flat-surfaced lands, an outer pair of longitudinally extending flat-surfaced lands and a slot intermediate said inner pair of lands, longitudinally extending vertical surfaces on each of said length defining members at right angles to said working faces having reference holes evenly spaced therealong, a locator fitting having a locator hole, said locator fitting being mounted on the working face of one of said length defining members, said locator fitting having an accurate flat face resting on the lands of said working face and an accurate flat guide surface in abutting engagement with the longitudinally extending flat guide surface of said length defining member for squaring the fitting relative to the length defining member, means cooperating with said locator hole in the fitting and said reference holes in the length defining member for properly positioning the fitting, and means adjustably mounted in the slot intermediate the inner pair of lands for securing said fitting to said length defining member.

LELAND A. BRYANT.

REFERENCES CITED

The following references are of record in the file of this patent:

UNITED STATES PATENTS

| Number | Name | Date |
|---|---|---|
| 824,484 | Justice | June 26, 1906 |
| 1,311,653 | Koepp | July 29, 1919 |
| 1,463,882 | Fuller | Aug. 7, 1923 |
| 1,621,765 | Bonswor | Mar. 22, 1927 |
| 1,918,888 | Aska | July 18, 1933 |
| 1,920,573 | Ladigo | Aug. 1, 1933 |
| 2,212,421 | Henderson | Aug. 20, 1940 |
| 2,236,876 | Jablow | Apr. 1, 1941 |
| 2,328,040 | Weightman | Aug. 31, 1943 |
| 2,377,904 | Roach | June 12, 1945 |
| 2,433,889 | Bryant | Jan. 6, 1948 |